Jan. 20, 1970  R. J. SCHWARTZ  3,490,286
ELECTRICAL APPARATUS FOR WELL TOOLS
Filed Aug. 3, 1967  2 Sheets-Sheet 2
Fig. 2A
$F_c$
Fig. 2B
$F'_r$
Fig. 2C
OUTPUT OF FLIP-FLOP 31 AND FILTER 32
Fig. 2D
OUTPUT OF FLIP-FLOP 31 AND FILTER 32
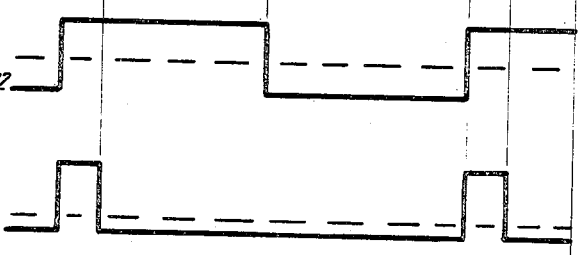
Fig. 3A
OUTPUT OF DIVIDE BY "2" CIRCUIT 28
Fig. 3B
DATA PULSES FROM CABLE
Fig. 3C
COUNTER TRANSFER PULSE
Fig. 3D
COUNTER RESET PULSE
Robert J. Schwartz
INVENTOR.
BY Edward M. Roney
ATTORNEY United States Patent Office 3,490,286
Patented Jan. 20, 1970

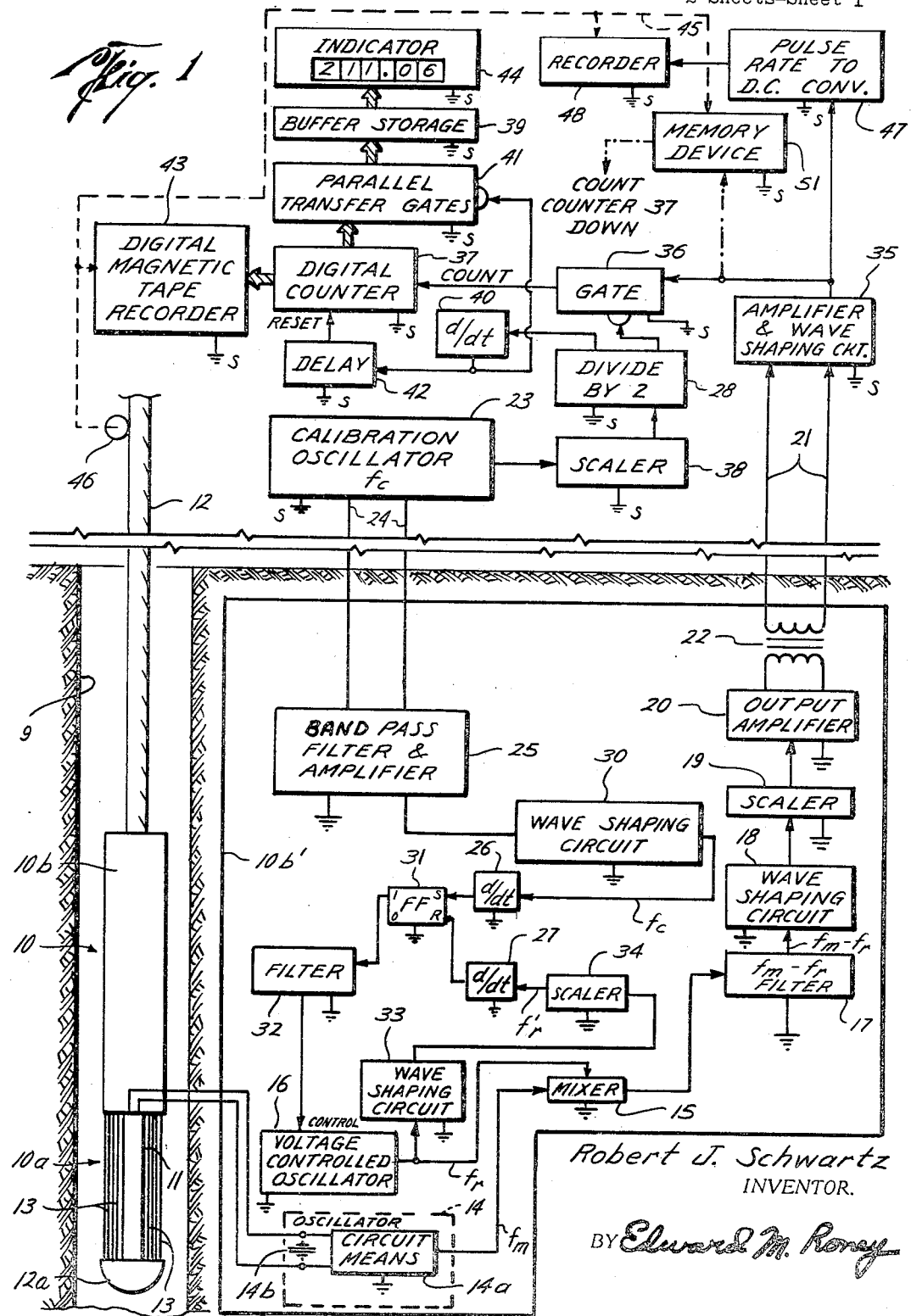

3,490,286
ELECTRICAL APPARATUS FOR WELL TOOLS
Robert J. Schwartz, Houston, Tex., assignor to Schlumberger Technology Corporation, Houston, Tex., a corporation of Texas
Filed Aug. 3, 1967, Ser. No. 658,180
Int. Cl. G01k 5/18, 5/52, 5/72
U.S. Cl. 73—362                    11 Claims

ABSTRACT OF THE DISCLOSURE

A technique for controlling the frequency of an oscillator in a tool in a borehole from the surface of the earth so that a highly stable source of frequency can be obtained under adverse environmental conditions downhole. A calibration frequency is transmitted from the surface of the earth to the tool and compared with the scaled-down frequency of the oscillator and the oscillator frequency is adjusted in response to the compared frequencies. This technique is valuable in temperature logging systems which utilize a so-called "quartz crystal thermometer" wherein a signal whose frequency is proportional to measured temperature is generated. Due to the high frequency of such a temperature measuring system, the measure frequency is beat against a reference frequency generated from a reference oscillator in the tool and the resulting difference frequency component transmitted to the surface of the earth. The reference frequency is controlled by the above-mentioned frequency controlling technique.

---

This invention relates to electrical apparatus used in tools which are lowered into a borehole drilled into the earth. In one form, the present invention relates to methods and apparatus for regulating the frequency of an oscillator in a tool in the borehole from the surface of the earth. In another form, the present invention relates to methods and apparatus for measuring temperature in a borehole.

One common manner of investigating conditions existing in a borehole is to move a thermometer through a borehole and measure the temperature existing in the borehole. This information is then supplied to the surface of the earth where a log of temperature versus depth is recorded. The resulting temperature log provides valuable information that is utilized, for among other things, locating the height of cement behind casing, locating gas producing horizons during production, and for correlation with the electrical log for depth control in perforation operations.

In locating the height of cement behind casing, the cement usually generates a great amount of heat in setting and thus a temperature change is generally observed at the level where cement is found behind the casing. In determining the location of the gas producing horizons, there is usually a considerable drop in temperature opposite a gas producing zone due to the cooling effect caused by the expansion of gas. Thus, a temperature survey shows the points of entry of gas into the borehole. In utilizing the temperature log for depth correlation, it is known that a maximum temperature is usually found in caved sections where greater volumes of cement are deposited. Thus, the temperature log will show a temperature increase in cased boreholes at these caved sections where more cement is deposited, which will provide good correlation with the section gauge and electrical logs.

It has been found that temperature can be accurately measured by utilizing a quartz crystal resonator to control the frequency of an oscillator. The quartz crystal and oscillator is called a "quartz crystal thermometer." By placing the quartz crystal at the point where the temperature is to be measured, the frequency of the signal generated by the oscillator will be proportional to the measured temperature. It has been found that by so doing, temperatures of from $-40°$ C. to $+230°$ C. can be measured with resolutions up to $.0001°$ C. The resulting signal from the oscillator can then be transmitted over long cables without having the usual line loss problems common in resistance type thermometers which supply a varying DC signal over the cable. This is because the frequency of the transmitted signal and not the amplitude thereof is proportional to temperature.

However, it has been found that some quartz crystal resonators can provide a linear frequency versus temperature effect at a frequency of approximately 28 megacycles per second. Due to the frequency response of the cable connecting the tool in the borehole to the surface of the earth, it is extremely difficult to transmit signals at such a high frequency over the cable. One manner in which the information from such a high frequency signal can be transmitted to the surface of the earth is to beat the signal from the quartz crystal thermometer against a signal having a constant reference frequency and supplying the difference frequency to the surface of the earth. However, it is very difficult to obtain a constant reference frequency because of the harsh environmental conditions in the borehole, e.g., the frequency of the reference oscillator may drift due to temperature. This reference frequency could not be supplied directly from the surface of the earth because, again, of the frequency response of the cable.

It is therefore an object of the present invention to provide new and improved methods and apparatus for measuring temperature in a borehole.

It is another object of the present invention to provide new and improved methods and apparatus for maintaining an oscillator in a tool in a borehole at a constant frequency.

In accordance with one feature of the present invention, a method and apparatus for measuring a temperature in a borehole comprises moving a tool through a borehole and generating a signal whose frequency varies with temperature. The method and apparatus further comprises generating a reference signal having a reference frequency to be mixed with the temperature signal to produce a difference frequency signal for transmission to the surface of the earth. A calibration signal having a given calibration frequency is supplied to the tool from the surface of the earth for comparison with a divided frequency version of the reference frequency signal. This comparison operation produces a control signal which is used to maintain the reference frequency substantially constant.

In accordance with another feature of the present invention, a method and apparatus for providing a signal having a constant frequency in a tool in a borehole comprises generating an output signal having a given frequency and supplying a calibration signal having a substantially constant calibration frequency from the surface of the earth to the tool. The method and apparatus further comprises adjusting the output signal frequency in response to the frequency of the calibration signal and the frequency of the output signal so that the output signal frequency is substantially constant. This output signal can then be used as a reference frequency to beat with another signal whose frequency is representative of a measured subsurface parameter. The resulting difference frequency signal can be transmitted to the surface of the earth. By so doing, the information content of a high frequency signal can be accurately transmitted over a cable having poor frequency response without losing any of the information.

For a better understanding of the present invention, together with other and further objects thereof, reference is had to the following description taken in connection with the accompanying drawings.

Referring to the drawings:

FIGURE 1 shows a tool for measuring temperature in a borehole along with schematic representation of the electrical circuitry utilized in connection therewith;

FIGURES 2A–2D show the wave forms at various points in the circuitry in the tool of FIGURE 1; and FIGURES 3A–3D show the wave forms at various points in the circuitry at the surface of the earth of FIGURE 1.

Now referring to FIGURE 1, there is shown a tool 10 in a borehole 9 for measuring the temperature in the borehole. The tool 10 is supported in the borehole 9 on the end of a cable 12 which cable is reeled in and out of the borehole by a suitable drum and winch mechanism (not shown). The tool 10 has a lower portion 10a which includes a sensing or thermometer structure, and more particularly, the sensing or thermometer structure 11 has a quartz crystal resonator housed in a fluid-tight, pressure protected housing. The sensing structure 11 is supported at the top by a main body portion 10b of the tool 10 and at the bottom by a nose portion 12a which is attached to the main body portion 10b by suitable connecting rods 13. In this manner, the sensing structure 11 is open to and in direct contact with the bore hole fluids. The housing portion of the structure 11 has a thermal conductivity between the sensing element and the borehole fluids that will allow changes in temperature of the borehole fluids to be sensed by the sensing element in a relatively short period of time.

The main body portion 10b includes a fluid-tight housing (not shown) which houses the downhole electronics. This fluid-tight housing 10b is represented to the right of the borehole 9 by the box designated 10b' which shows the downhole electronics in detail.

Now referring to the downhole electronics within the fluid-tight housing 10b', an oscillator 14, which includes a circuit means 14a and the quartz crystal resonator, schematically represented by the crystal designated 14b, generates a signal having a measure frequency $f_m$ which frequency $f_m$ varies in accordance with the temperature measured by the sensing element or crystal 11. This signal is applied to one input of a mixer 15, the other input to mixer 15 being supplied from a voltage controlled oscillator 16 which generates a reference signal having a reference frequency designated $f_r$. A suitable low-pass filter 17 is coupled to the output of mixer 15 so as to pass only those signals whose frequencies are in the range of the difference frequency component of the output signal from mixer 15, i.e., $f_m - f_r$. Since the measure frequency $f_m$ will vary with temperature, the low-pass filter 17 should have a sufficiently wide band width to pass the difference frequency $f_m - f_r$ for any frequency that can be produced by oscillator 14 (i.e. $f_m$ varies with temperature).

The output signal from filter 17 is supplied to a wave-shaping circuit 18, such as a Schmitt trigger, which transforms the output signals from filter 17 to square wave signals having the same frequency. The resulting square wave output signal from wave-shaping circuit 18 is supplied to a scaler 19 which acts as a frequency divider to reduce the frequency of the signal from wave-shaping circuit 18 to a frequency desirable for transmission up the cable to the surface of the earth. (Note—If the difference frequency $f_m - f_r$ is within the usable frequency response of the cable, scaler 19 would not be necessary.) The output signal from scaler 19 is supplied to a suitable output amplifier or cable driving circuit 20 which couples the pulses onto two or more conductors of cable 12 thus passing the signal to the surface of the earth.

Thus, it can be seen that the signal transmitted to the surface of the earth via cable 12 will be substantially reduced in frequency from the measure frequency $f_m$.

The frequency of the signal transmitted to the surface of the earth will then be $$\frac{f_m - f_r}{s}$$

where $s$ is the dividing factor of the scaler 19. Desirably, the reference frequency $f_r$ of oscillator 16 should be selected at a suitable reference point on the frequency-to-temperature curve of the oscillator 14, such as for example, 0° C. (Borehole temperatures are greater than 0° C.) In this manner, the signal output from filter 17, having a frequency of $f_m - f_r$, can be calibrated in terms of change from 0° C. In one type of quartz crystal resonator developed by the Hewlett-Packard Company, model number dy2800a quartz thermometer, the resonant frequency has been found to be in the range of 28 megacycles with a frequency slope of approximately 1,000 c.p.s. per ° C. up to 230° C. It can be seen that if the frequency $f_r$ of oscillator 16 is set at the frequency corresponding to 0° C., the frequency of the signal received at the surface of the earth can be calibrated directly in terms of temperature, i.e., 0.005 megacycle=5° C., 0.230 megacycle=230° C. Thus, it can be seen that very slight drifts in frequency of the reference oscillator 16 could provide great inaccuracies in the frequency of the signal transmitted to the surface of the earth, and thus the measured temperature. For example, a 0.1% drift of the downhole reference frequency will produce a 28° C. error.

To alleviate this problem, the voltage controlled oscillator 16 is controlled by a calibration frequency which is supplied from the surface of the earth, where the frequency can be readily controlled. This is shown in FIGURE 1 by a calibration oscillator 23, having a calibrate frequency $f_c$, supplying a signal at this frequency $f_c$ over a conductor pair 24 to a suitable bandpass filter and amplifier 25 in the tool 10. Downhole tool power can be supplied from the surface over suitable conductors.

The output signal from the amplifier and filter 25, which may be sinusoidal, is supplied to a suitable wave-shaping circuit 30 such as a Schmitt trigger which acts to square-up the wave-shape from filter and amplifier 25. The output signal from wave-shaping circuit 30, after being differentiated by a differentiator 26, is supplied to the set input of a flip-flop 31 whose "1" output is supplied to the input of a filter 32. Filter 32 provides a varying DC control signal proportional to the average "on-time" of the output signal from flip-flop 31 to the frequency and phase control input of voltage controlled oscillator 16. This control could take the form of supplying the DC control voltage to a varicap which is in parallel with the frequency control element, e.g., a crystal. (Note—The period of the output signal from flip-flop 31 is substantially constant since the constant calibration frequency $f_c$ turns flip-flop 31 on, and thus controls the period thereof.)

The output signal from voltage controlled oscillator 16 is supplied to a wave-shaping circuit 33 such as a Schmitt trigger which acts to square-up the wave-shape from oscillator 16. This square wave signal is supplied to a scaler 34 which reduces the reference frequency $f_r$ to a new frequency $f_r'$. The scale factor of scaler 34 is chosen so that the new reference frequency $f_r'$ is near the calibration frequency $f_c$. This output signal from scaler 34, after differentiation by a differentiator 27, is supplied to the reset input of flip-flop 31. Flip-flop 31 is responsive to positive going pulses only. This frequency and phase control operation comprising supplying the calibration frequency $f_c$ and the scaled-down reference frequency $f_r'$ to flip-flop 31 and adjusting the phase and frequency of voltage controlled oscillator 16 acts to maintain the scaled-down reference frequency $f_r'$ equal to the calibration frequency $f_c$. Since the scaled-down reference frequency $f_r'$ is proportional to the reference frequency $f_r$, it can be seen that the frequency $f_r$ will be maintained constant by this action, i.e. it will be maintained substantially equal to the scale factor of scaler 34 times the calibration frequency $f_c$.

To better understand this operation, refer to FIGURES 2A through 2D. The wave-shape of FIGURE 2A represents the calibration frequency signal from wave-shaping circuit 30, of frequency $f_c$. The wave-shape of FIGURE 2B represents the scaled-down reference signal from scaler 34, of frequency $f_r'$. The solid line wave-shape of FIGURE 2C represents the output signal from flip-flop 31. It can be seen that the positive going edge of the calibration signal from wave-shaping circuit 30 of frequency $f_c$ shown in FIGURE 2A, turns the flip-flop 31 on and positive going edge of the scaled-down reference signal from scaler 34, of frequency $f_r'$ shown in FIGURE 2B (consider just the solid line wave-shape for now) turns the flip-flop 31 off. Thus, it can be seen that the wave-shape of FIGURE 2C has equal on and off times. The resulting DC control signal from filter 32 to voltage controlled oscillator 16 is shown as the dash line in FIGURE 2C.

Now consider what happens when the frequency or phase of the scaled-down reference signal from scaler 34 of frequency $f_r'$ begins changing, as represented by the dash line wave form in FIGURE 2B. Looking at FIGURE 2D, there is shown the resulting wave form of the output of flip-flop 31 for the case of the dash line wave form of FIGURE 2B. It can be seen that this wave form of FIGURE 2D has greatly reduced "on" times, which acts to lower the DC control signal supplied to voltage controlled oscillator 16. This decreased control signal supplied to oscillator 16 acts to decrease the frequency thereof until the wave form of flip-flop 31 and the signal from filter 32 take on the form shown in FIGURE 2C. Thus, it can be seen that by this means, the frequency of the signal output from oscillator 16 will always be adjusted to the correct frequency. The phase between $f_c$ and $f_r'$ will be maintained approximately 180° out of phase by this operation.

Although, two conductor pairs 21 and 24 have been shown for transmitting the temperature measurements to the surface of the earth and the calibration frequency $f_c$ downhole, it is to be understood that a single transmission medium could be utilized on a time sharing basis. In this event, the calibration frequency could be transmitted downhole once in a while to be compared with the scaled-down reference frequency $f_r'$. The resulting DC control signal to the downhole voltage controlled oscillator could be set into a suitable memory device until the next calibration time period.

Now considering the circuitry at the surface of the earth, the signal supplied up the cable 21 to the surface of the earth, which has a frequency of $$\frac{f_m - f_r}{s}$$

is supplied to an amplifier and wave-shaping circuit 35 which could comprise, for example, a Schmitt trigger tied to the output of an amplifier so that the output signal from circuit 35 will be in the form of pulses. The amplifier 35 supplies the surface ground potential represented by the ground symbol S. These output pulses are applied to a gate circuit 36 whose output is supplied to the count input of a digital counter 37 as, for example, a binary counter. The binary output from counter 37 is transferred in parallel form to a buffer storage unit 39 via a plurality of parallel transfer gates 41. Both the "1" and "0" outputs from digital counter 37 are connected via gates 41 to buffer storage unit 39. The control for gate 36 is supplied from the calibration oscillator 23 via a scaler 38 and "divide by 2" flip-flop 28. One output from flip-flop 28 energizes gate 36 and the other output therefrom is supplied to a differentiator 40. The output signals from differentiator circuit 40 are used to energize the parallel transfer gates 41 and, after a suitable delay by delay circuit 42, to reset the digital counter 37. If desired, a one-shot could be included on the output of delay circuit 42 to reshape the pulse therefrom.

To understand the operation of this surface circuitry, refer to FIGURES 3A–3D. FIGURE 3A shows the wave form of the output of the divide by 2 flip-flop which is supplied to gate 36 and FIGURE 3B shows the pulses from amplifier and wave-shaping circuit 35 that are applied to gate circuit 36. Since the positive going pulse from divide by 2 circuit 28 energizes or opens gate 36, those pulses which arrive during the positive half cycle of the FIGURE 3A wave form pass to counter 37 where they are counted. Since the signal (not shown) to differentiator circuit 40 is 180° out of phase with the signal of FIGURE 3A, the leading edge of the negative half cycle of the FIGURE 3A wave-shaped (or the leading edge of the positive half cycle of the signal supplied to differentiator 40) causes a positive pulse to be applied to parallel transfer gates 41, and to the reset input of counter 37, which is responsive to positive pulses only, after the delay by delay circuit 42. The transfer and reset pulses are shown in FIGURES 3C and 3D respectively.

Now, if the scale factor of scaler 38, in combination with flip-flop 28, is set at a proper time base, the count registered in digital counter 37 each time that gate 36 is opened will be equal to the measured downhole temperature referenced to 0° C. Assuming the frequency slope of the downhole quartz crystal thermometer, is 1,000 c.p.s. per °C., if the frequency of the pulses applied to gate 36 is set at 500 cycles per second, the number of pulses counted by digital counter 37 during each positive half cycle of the FIGURE 3A wave-shape will be in terms of degrees centigrade provided the scale factor of the downhole scaler 19 is "1." For example, if the frequency of the signal transmitted to the surface of the earth is 200 kilocycles, it is clear that 200 pulses will be counted by counter 37 during this positive half cycle.

If the scale factor of scaler 19 is greater than "1," which may be required to reduce the frequency of the pulses transmitted to the surface of the earth because of the frequency response of the cable, the frequency of the signals applied to gate 36 can be adjusted accordingly so that the same direct reading of temperature can take place in digital counter 37. Although it is desirable that the count of the digital counter 37 be calibrated directly in degrees centigrade, it is to be understood that this is not required, since other means can be utilized to accomplish this calibration as, for example, calibrating the scale of a suitable readout device. For greater resolution, the frequency of the signals applied to gate 36 may be at a lower frequency to yield a longer timing interval for which a reading of 200.000° C. would be indicated.

The count in the digital counter is written into a suitable digital magnetic tape recorder 43 which is driven by a shaft 45 which is coupled to a rotating wheel 46. The wheel 46 is coupled to the cable 12 so as to rotate in accordance with the movement of the tool 10 in the borehole. Thus, this digital indication of the measured downhole temperature is recorded in digital magnetic tape recorder 43 as a function of depth.

There is also shown in FIGURE 1 a suitable indicating device 44 which can provide an instantaneous indication of temperature as the tool 10 is being moved through the borehole. This indicator 44 could comprise a so-called "nixie" tube device and is connected to the output of the buffer storage unit 39. In operation, a digital number placed in buffer storage unit 39 by transferring the number in digital counter 37 thereto, will provide a constant indication in indicator 44 until the next number is transferred into buffer storage unit 39.

There is also shown in FIGURE 1, means for direct analog recording of the measured temperature versus depth. This is accomplished by applying the signals from amplifier and wave-shaping circuit 35 to a pulse rate to DC converter 47 which provides a DC signal proportional to frequency, and thus proportional to temperature, to an analog recorder 48 such as the standard photographic recorder. Recorder 48 is also driven by the shaft 45 as a function of depth. Alternatively, the output of the digital counter 37 might be connected to a digital-to-analog converter to yield an analog output.

There is another way of reducing the frequency of the output signal from oscillator 14 for transmission to the surface of the earth. That is to supply the output measure signal from oscillator 14 to a scaling circuit having a very large scale factor so as to reduce the measure frequency of $f_m$ to a sufficiently low value for transmission purposes. However, this would require a great many stages in the scaling circuit to reduce the measure frequency $f_m$, which is in the vicinity of 28 mc., down to a frequency sufficient for transmission to the surface of the earth. However, even more important, by providing such a large scaling factor, the resolution of the temperature measuring system, in a finite time period, will be greatly reduced. This can easily be seen by noting that the frequency differential between 0° C. and 230° C. is only 230 kilocycles which is less than a 1% change at 28 megacycles. If the scaling factor applied to the frequency of $f_m$ is 1,000, for example, to reduce the frequency of the signal transmitted to the surface of the earth down to a center frequency of approximately 280 kilocycles, this 1% change from 0° C. to 230° C. would represent only 230 cycles per second. Thus, to obtain a desired degree of resolution, the frequency applied to gate 36 would have to be reduced to an unreasonably low frequency (or the time constant of pulse rate to DC converter 47 would have to be substantially increased), which would then affect the maximum logging speed, i.e., the rate at which the tool 10 could be moved through the borehole.

It is to be understood that the temperature measuring system of the present invention could be utilized to provide differential temperature measurements, as well as the absolute temperature measurements heretofore shown. To accomplish this, a duplicate temperature measuring system to the one shown in FIGURE 1 could be utilized (but using the same reference frequency source). To obtain the differential temperature reading, the reading derived from one of the downhole sensing elements could be utilized to count digital counter 37 up and the reading from the other downhole sensing device utilized to count it down. The resulting number in digital counter 37 would represent the differential measurement. Alternatively, one temperature measuring system could be utilized and the measurement utilized to count the digital counter 37 up. The measurement could also be stored in a suitable memory device operated as a function of borehole depth and the measurement readout at a specified depth interval later, utilized to count the counter down to obtain the differential measurement. This is represented in FIGURE 1 by the dash-dot line from the output of amplifier and wave-shaping circuit to the input of a memory device 51 which is driven by the shaft 45. Obviously, in this embodiment, the gating to the digital counter 37 would have to be suitably modified to allow for both the count-up and count-down modes.

Also, an absolute temperature measurement could be obtained in addition to the differential measurement by providing an additional set of parallel transfer gates, buffer storage and indicator (like the ones designated 41, 39 and 44 respectively). The gating would be such that the number in digital counter 37 after it had been counted up would be gated out to the auxiliary buffer storage and indicator before the counter 37 was counted down. This readout quantity would, then, be the absolute temperature measurement.

While there have been described what are at present considered to be preferred embodiments of this invention, it will be obvious to those skilled in the art that various changes and modifications may be made therein without departing from the invention, and it is therefore, intended to cover all such changes and modifications as fall within the true spirit and scope of the invention.

What is claimed is:

1. Apparatus for measuring temperature in a borehole comprising:
   a tool adapted to be lowered into a borehole;
   a signal generator in the tool whose frequency varies with temperature;
   frequency reference means at the tool for generating a signal having a reference frequency;
   means for supplying a calibration signal from the surface of the earth to the tool having a substantially constant calibration frequency;
   means at the tool responsive to the calibration frequency for adjusting the reference frequency to maintain the reference frequency substantially constant;
   means for mixing the reference frequency signal with the signal generator frequency signal; and
   means responsive to the difference frequency component of the mixed signals for supplying a signal to the surface of the earth which is representative of the measured temperature whereby the frequency of the signal transmitted to the surface of the earth is less than the maximum permissible transmission frequency.

2. The apparatus of claim 1 wherein the means for adjusting the reference frequency includes means responsive to the calibration frequency signal and the reference frequency signal for providing a control signal proportional to a frequency relationship between the calibration frequency and the reference frequency for maintaining a predetermined relationship between the reference frequency and the calibration frequency.

3. The apparatus of claim 1 wherein the means for adjusting the reference frequency includes:
   means for scaling the reference frequency down by a given scale factor; and
   means responsive to the scaled-down reference frequency and the calibration frequency for supplying a control signal representative of the difference in frequency between the scaled-down reference frequency and the calibration frequency for maintaining a predetermined relationship between the reference frequency and the calibration frequency.

4. The apparatus of claim 1 and further including means at the surface of the earth for providing an indication of the measured temperature, said indication providing means including frequency responsive means responsive to the frequency of the transmitted signal for producing numerical representations of said measured temperature, means responsive to said calibration signal for gating said transmitted signal to said frequency responsive means for a time period determined by the frequency of said calibration signal.

5. The apparatus of claim 4 and further including digital recording means for recording said numerical representations as a function of borehole depth, and timing means responsive to said calibration signal for periodically transferring said numerical representations to said digital recording means and resetting said frequency responsive means to a desired reference designation.

6. A method of measuring temperature in a borehole comprising:
   moving a tool through a borehole;
   generating a signal whose frequency varies with temperature;
   generating a signal having a relatively constant reference frequency;
   supplying a calibration signal having a substantially constant calibration frequency from the surface of the earth to the tool;
   adjusting the reference frequency in response to the calibration frequency to maintain the reference frequency substantially constant;

mixing the signal having a relatively constant reference frequency with the signal whose frequency varies with temperature to obtain a difference frequency signal; and supplying a signal representative of the difference frequency to the surface of the earth to obtain a representation of borehole temperature at the surface of the earth.

7. The method of claim 6 wherein the step of adjusting the reference frequency includes the steps of:

scaling down the reference frequency to a lower value; and comparing the calibration frequency with the scaled-down reference frequency and varying the reference frequency in response to the frequency difference therebetween until the calibration frequency and scaled-down reference frequency are substantially the same.

8. Apparatus for providing a signal having a constant frequency in a tool in a borehole, comprising:

an adjustable frequency oscillator in the tool for generating an output signal having a selectable frequency;

means for supplying a calibration signal having a substantially constant calibration frequency from the surface of the earth to the tool;

means for scaling down the frequency of the oscillator output signal;

bistable means adapted to be set by one of the scaled-down frequency or calibration frequency signals and reset by the other of said signals to generate a difference signal representative of the frequency and phase difference therebetween; and means for filtering the frequency difference signal to produce a control signal whose amplitude is proportional to said frequency and phase difference for application to said adjustable frequency oscillator to maintain the frequency of the oscillator output signal substantially constant.

9. A method of providing a signal having a constant frequency in a tool in a borehole, comprising:

generating an output signal having a selectable frequency in the tool;

supplying a calibration signal having a substantially constant calibration frequency from the surface of the earth to the tool;

scaling down the output signal frequency to a lower frequency;

comparing the calibration signal with the scaled-down output signal and generating a signal having a phase relationship representative of the frequency and phase relationship between the calibration and scaled-down signals;

filtering the phase relationship signal to produce a control signal whose magnitude is representative of said phase relationship; and adjusting the frequency and phase of the output signal in response to said control signal to maintain the frequency of said output signal substantially constant.

10. In well logging apparatus, the combination comprising:

a tool adapted to be lowered into a borehole;

a signal generator in the tool whose frequency varies with a measured parameter;

frequency reference means at the tool for generating a signal having a reference frequency;

means for supplying a calibration signal from the surface of the earth to the tool having a substantially constant calibration frequency;

means for dividing the frequency of the reference frequency signal by a predetermined amount to produce a divided frequency reference signal;

means at the tool responsive to the calibration frequency signal and the divided frequency reference signal for comparing the calibration frequency with the divided frequency and adjusting the reference frequency to maintain the reference frequency substantially constant;

means for mixing the reference frequency signal with the signal generator output signal; and means responsive to the difference frequency component of the mixed signals for supplying a signal to the surface of the earth which is representative of the measured parameter whereby the frequency of the signal transmitted to the surface of the earth is less than the maximum permissible transmission frequency.

11. A method of processing well logging signals for transmission to the surface of the earth from a tool in a borehole, comprising:

moving a tool through a borehole while measuring a subsurface parameter;

generating a signal whose frequency varies with the measured parameter;

generating a signal having a reference frequency;

supplying a calibration signal having a substantially constant calibration frequency from the surface of the earth to the tool;

dividing the frequency of the reference frequency signal by a predetermined factor;

comparing the divided reference frequency with the calibration frequency and adjusting the reference frequency to maintain the reference frequency substantially constant;

mixing the reference frequency signal with the signal whose frequency varies with the measured parameter to obtain a difference frequency signal; and supplying a signal representative of the difference frequency to the surface of the earth to obtain a representation of the measured parameter at the surface of the earth.

References Cited

UNITED STATES PATENTS

| | | | |
|---|---|---|---|
| 2,685,798 | 8/1954 | Goble | 73—362 |
| 2,721,267 | 10/1955 | Collins | 73—362 |
| 3,212,023 | 10/1965 | Broadhead | 331—25 |

LOUIS R. PRINCE, Primary Examiner

DENIS E. CORR, Assistant Examiner

U.S. Cl. X.R.

73—154